(12) United States Patent
Thompson

(10) Patent No.: US 7,242,327 B1
(45) Date of Patent: Jul. 10, 2007

(54) DECIMATING DOWN CONVERTER AND RELATED METHODS

(75) Inventor: Mark W. Thompson, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/402,086

(22) Filed: Apr. 11, 2006

(51) Int. Cl.
*H03M 7/00* (2006.01)

(52) U.S. Cl. .......................................... 341/61; 341/59
(58) Field of Classification Search .............. 341/50–90
See application file for complete search history.

(56) References Cited

U.S. PATENT DOCUMENTS

| | | | | |
|---|---|---|---|---|
| 4,376,933 A | * | 3/1983 | Saran et al. ................. | 341/67 |
| 5,023,617 A | * | 6/1991 | Deering ...................... | 342/70 |
| 5,023,821 A | * | 6/1991 | Argintaru et al. ........... | 708/3 |
| 5,369,606 A | | 11/1994 | Hessel ..................... | 364/724.16 |
| 5,375,146 A | | 12/1994 | Chalmers ..................... | 375/103 |
| 5,923,273 A | | 7/1999 | Pastorello .................... | 341/77 |
| 2004/0208264 A1 | | 10/2004 | Norris et al. ............... | 375/340 |

* cited by examiner

*Primary Examiner*—Lam T. Mai
(74) *Attorney, Agent, or Firm*—Allen, Dyer, Doppelt, Milbrath & Gilchrist, P.A.

(57) ABSTRACT

A system of downconverting an intermediate frequency (IF) phase or frequency modulated signal to a digital baseband includes an N bit shift register circuit that receives a binary input as a 1-bit input sample data stream of an IF signal. A decimation circuit includes a memory and receives data from the N bit shift register circuit and stores N 1-bit binary samples as address bits and performs decimation, downconversion and filtering by accessing memory values at a predetermined rate.

24 Claims, 7 Drawing Sheets

LIMITED
IF SIGNAL
UNDERSAMPLED

COMPLEX LO

DOWN CONVERTER

DECIMATING DOWN CONVERTER AND RELATED METHODS

FIELD OF THE INVENTION

The present invention relates to converting intermediate frequency (IF) signals to digital baseband, and more particularly, the present invention relates to downconverting a frequency or phase modulated intermediate frequency signal to digital baseband.

BACKGROUND OF THE INVENTION

Some multi-band or other tactical radios operate in the high frequency (HF), very high frequency (VHF) (for satellite communications), and ultra high frequency (UHF) bands. The range of these multi-band tactical radios can operate over about 2.0 through about 512 MHz frequency range. Next generation radios will probably cover about 2.0 to about 2,000 MHz (or higher) to accommodate high data rate waveforms and less crowded frequency bands. This high frequency transmit mode is governed by standards such as MIL-STD-188-141B, while data modulation/demodulation is governed by standards such as MIL-STD-188-110B, the disclosures which are incorporated by reference in their entirety.

UHF standards, on the other hand, provide different challenges over the 225 to about 512 MHz frequency range, including short-haul, line-of-sight (LOS) communication and satellite communications (SATCOM) and cable. This type of propagation can be obtained through different weather conditions, foliage and other obstacles making UHF SATCOM an indispensable communications medium for many agencies. Different directional antennas can be used to improve antenna gain and improve data rates on the transmit and receive links. This type of communication is typically governed in one example by MIL-STD-188-181B, the disclosure which is incorporated by reference in its entirety. This standard specifies a family of constant and non-constant amplitude waveforms for use over satellite links.

The joint tactical radio system (JTRS) implements some of these standards and has different designs that use oscillators, mixers, switchers, splitters, combiners and power amplifier devices to cover different frequency ranges. The modulation schemes used for these types of systems can occupy a fixed bandwidth channel at a fixed carrier frequency or can be frequency-hopped. These systems usually utilize memoryless modulations, such as a phase shift keying (PSK), amplitude shift keying (ASK), frequency shift keying (FSK), quadrature amplitude modulation (QAM), or modulations with memory such as continuous phase modulation (CPM) and combine them with a convolutional or other type of forward error correction code.

These systems often use a number of base station segments that are operative with HF and VHF communications nets and often ad-hoc communications networks in which a plurality of N mobile radios are located on a terrain, typically each moving with no fixed infrastructure. Many of these systems must sample and downconvert a frequency or phase modulated intermediate frequency (IF) signal. Some of the signals are amplitude modulated waveforms with a combination of phase/frequency and amplitude modulations. These small and low power radios typically minimize the amount of circuitry used. One approach is to convert as quickly as possible to the digital or software domain where higher levels of integration exist. Software and firmware processing can be efficiently done at baseband and an efficient method to convert analog IF signals to baseband frequencies is required.

In a prior art downconverter system 10 such as shown in FIG. 1, IF signals are sampled at a sample rate (F) using an analog/digital converter 12 to create an N-bit sample signal. Within the digital domain illustrated at 14, a complex local oscillator circuit multiplies the signal and converts it into a complex baseband signal using the local oscillator 16 and mixer 18. Complex low pass filtering and downconversion follow using a low pass filter 20 followed by downconversion decimator 22, another low pass filter 24, and decimator 26 as illustrated. These functions can consume considerable digital resources and consume considerable power depending on their clock rates.

SUMMARY OF THE INVENTION

In view of the foregoing background, it is therefore an object of the present invention to provide a system or method as a low power approach for sampling and downconverting a frequency or phase modulated IF signal to baseband in an efficient manner.

In accordance with one non-limiting example of the present invention, a system of downconverting an intermediate frequency (IF) phase or frequency modulated signal to digital baseband includes an N bit shift register circuit that receives a binary input as a 1-bit input sample data stream. A decimator circuit, including a memory, for example, block random access memory (RAM), receives data from the N bit shift register circuit and stores N 1-bit binary samples as address bits and performs decimation by accessing memory values at a predetermined rate. Although a block RAM is disclosed, other circuits could be used, for example, a Read Only Memory (ROM) or even an application specific integrated circuit (ASIC).

This decimator circuit is operative as a look-up table to perform a multiplication process of the 1-bit input sample data stream and a complex local oscillator (LO) data stream. In one non-limiting example, the decimator circuit performs the multiplication with either the real or the imaginary part of the complex LO. The decimator circuit also performs the filtering function. Thus, the down conversion, the decimation, and the filtering are performed in one step using the decimator circuit. The address bits and the memory in the decimator circuit are indicative of a complex local oscillator (LO) phase. A summer circuit can be operatively connected to the decimator circuit and create a single output for a time sample and a low pass filter can receive data from the summer circuit although the decimator circuit can also perform a filtering function. This low pass filter could be formed as a matched filter if no further decimation is required.

In another aspect, a plurality of N bit shift registers are arranged to receive the binary input as a 1-bit input data stream and shift data a predetermined number of times. The decimator circuit includes a memory and can be formed from individual memory circuits, such as RAM circuits, that connect respective ones of the shift registers and receive data from the N bit shift registers and store the N 1-bit binary samples as address bits and perform decimation by accessing memory values at a predetermined rate. It can perform decimation, down conversion and low pass filtering.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
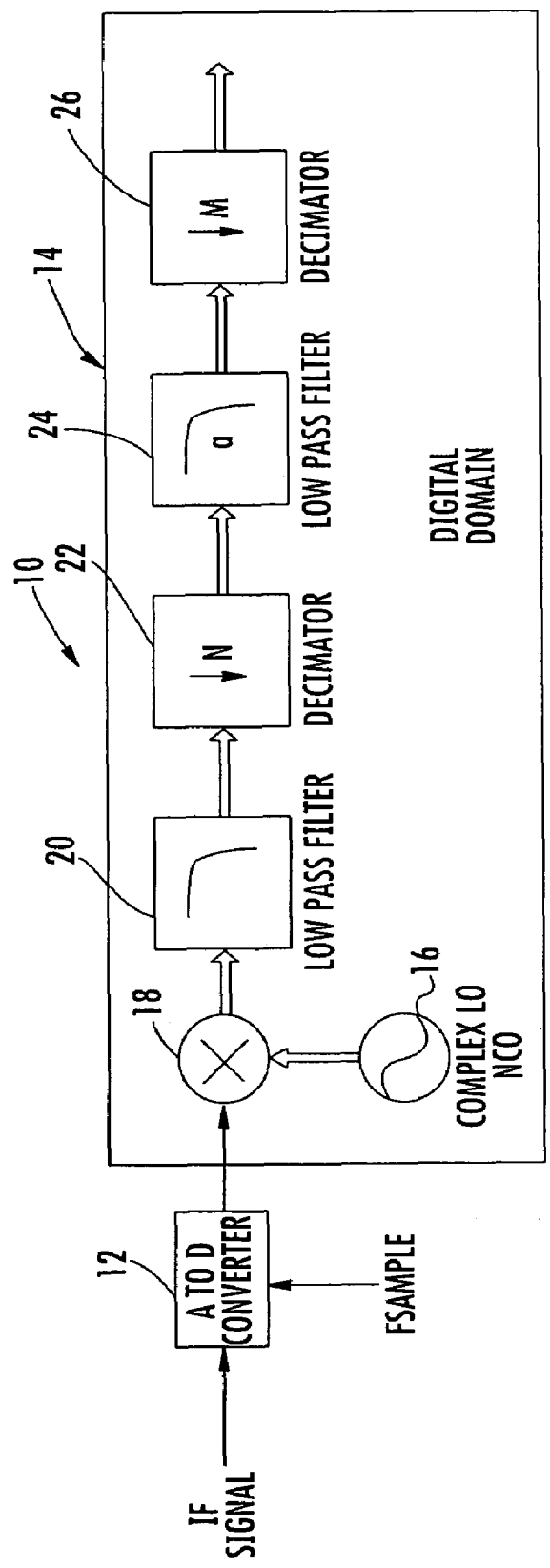
FIG. 1 is a block diagram of a prior art decimating downconverter.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In accordance with one non-limiting example of the present invention, an intermediate frequency signal is reduced to a simple 1-bit representation, which is processed by undersampling the 1-bit signal. This undersampled signal is downconverted through a low pass filter and decimated using a series of memory (tables) containing precomputed values. The memory could be RAM, ROM or an ASIC. The description will proceed with a description of RAM relative to the described embodiment shown in the drawings. These RAM's are addressed by the 1-bit input values and a phase counter is used to keep track of the current phase of the local oscillator. The RAM's are accessed at a lower rate than the input samples are collected to provide the decimation function. This reduction in sampling rate along with the reduction in the amount of circuitry reduces the size, complexity and overall power consumption. Thus, the downconversion of IF signals to digital baseband occurs in an efficient, low power manner.

In accordance with one non-limiting example of the present invention, the signals that typically can be downconverted are constant envelope phase or frequency modulated signals, but the embodiments as described are not limited to such signals. Any signal that can be represented using a one-bit binary stream can be downconverted, decimated and filtered. These signals can be limited in the analog domain without losing significant performance. In one non-limited signal is a frequency/phase modulated square wave that can be sampled using a one-bit representation. The sampling rate typically is much higher than the Nyquist rate. A one-bit input can be accomplished using a digital gate instead of an analog/digital converter as is used in many prior are systems. The processing of one-bit of data can be digitally efficient and various simplifications can be made. It is also possible to process the output of a Sigma-Delta analog/digital converter using the circuit described below. This circuit can also be used for non-constant envelope modulation schemes.

Figure 2:
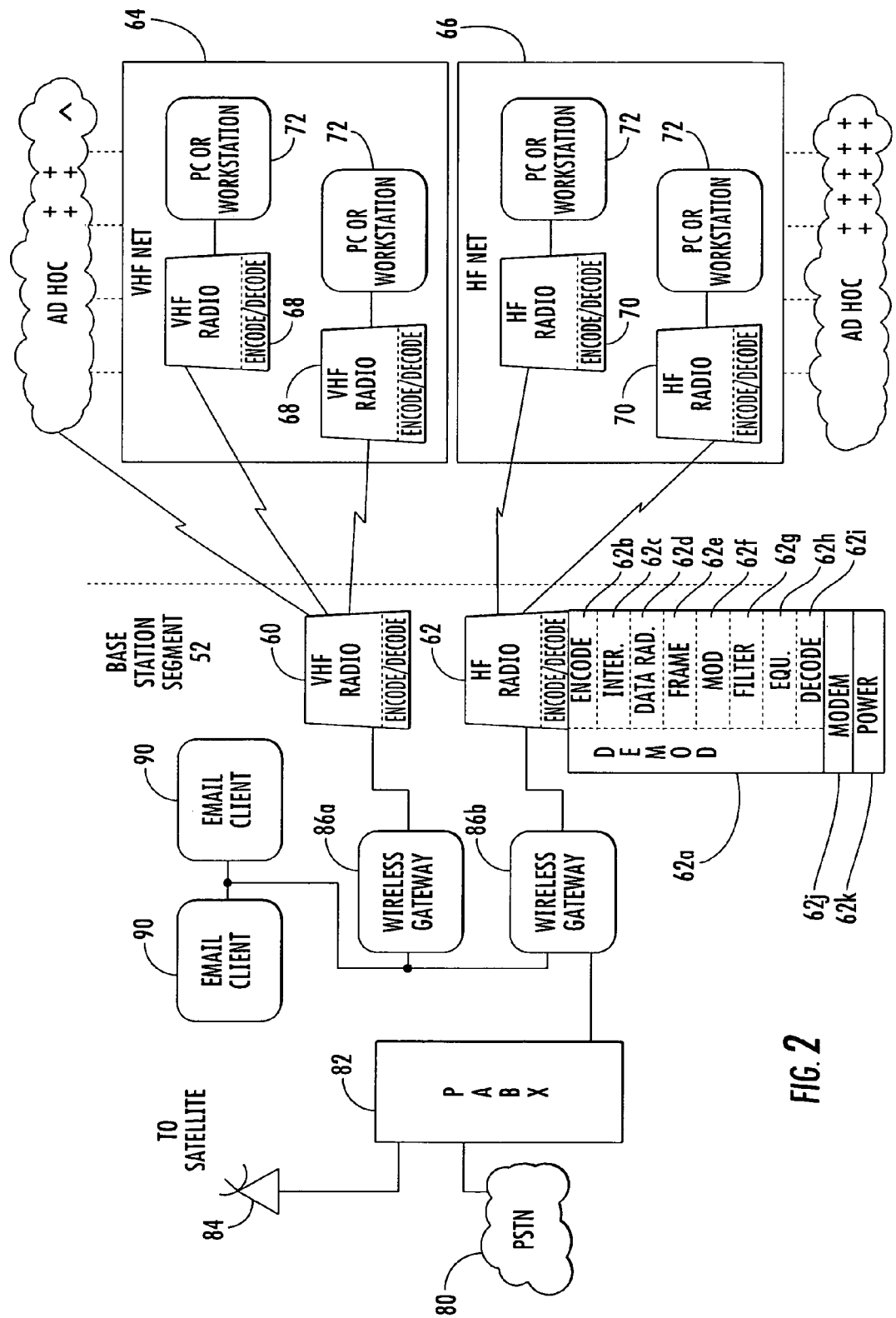
FIG. 2 is block diagram of a communications system that can be used for the present invention as a non-limiting example.

For purposes of description, a mobile radio communications system that can be used for the present invention is now set forth with regard to FIG. 2 to be described. This type of system has many components and devices that could incorporate the downconverter system and method as described.

This brief description of an example of a communications system that would benefit from the system and method of the present invention is described relative to a non-limiting example shown in FIG. 2. This high level block diagram of a communications system 50 includes a base station segment 52 and wireless message terminals that could be modified for use with the present invention. The base station segment 52 includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68,70. It should be understood that the HF or VHF networks include HF and VHF net segments that are infrastructure-less and operative as an ad-hoc communication network. Although UHF radios and net segments are not illustrated, these could be included.

The HF radio can include a demodulator circuit 62a and appropriate convolutional encoder circuit 62b, block interleaver 62c, data randomizer circuit 62d, data and framing circuit 62e, modulation circuit 62f, matched filter circuit 62g, block or symbol equalizer circuit 62h with an appropriate clamping device, deinterleaver and decoder circuit 62i modem 62j, and power adaptation circuit 62k as non-limiting examples. These and other circuits operate to perform the functions necessary for the present invention. Other illustrated radios, including all VHF mobile radios and transmitting and receiving stations can have similar functional circuits.

The base station segment 52 includes a landline connection to a public switched telephone network (PSTN) 80, which connects to a PABX 82. A satellite interface 84, such as a satellite ground station, connects to the PABX 82, which connects to processors forming wireless gateways 86a, 86b. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

It should be understood that in describing the downconverter of the present invention, binary values can represent 1 and −1 inputs. The system could have an undersampling process that results in a signal located at 2 MHz in one non-limiting example. A 2 MHz complex local oscillator (LO) is a multiple of a sample rate such as 24 Msps and therefore has limited output values. There is a short repeat cycle of 12 samples such as 0, 0.5, 0.866, 1, 0.866, 0.5, 0, −0.5, −0.866, −1, −0.866. This is a cycle of the real portion of the complex LO. The LO will have a real and imaginary portion (in-phase and quadrature). The imaginary portion can be generated by advancing the value of the phase input bits. The one-bit input sample stream can be multiplied by the complex local oscillator stream. A block RAM circuit can be used as a look-up table (LUT) to perform a multiplication process. This would eliminate the complex NCO and eliminate two multipliers in some examples.

Figure 3A:
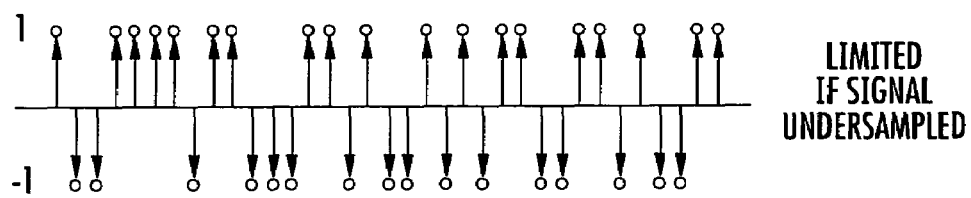
FIGS. 3A through 3C are graphic representations of a one-bit down conversion with a limited and undersampled IF signal, the real or imaginary part of a complex local oscillator circuit output and downconverter signal output shown, such that the real or imaginary outputs can come from the RAM by advancing the phase bits a correct amount.
Figure 3B:
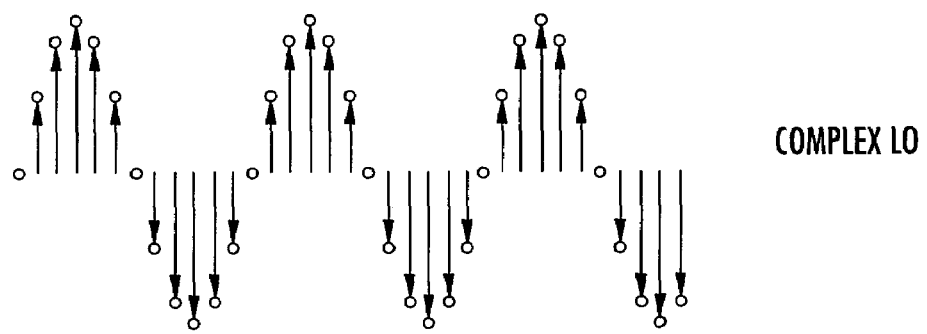
Figure 3C:
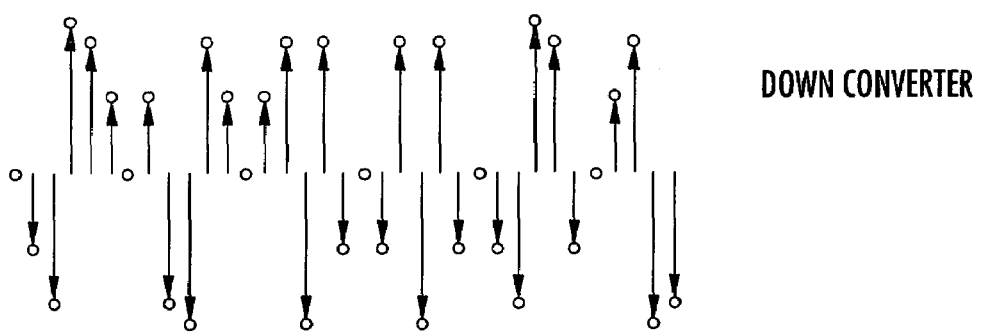

FIGS. 3A, 3B and 3C are graphical representations of a one-bit downconversion process. For example, FIG. 3A shows a graphic representing a limited IF signal that is undersampled with the input values that are limited to 1 and −1 values. As shown in FIG. 3B, the complex local oscillator can have a limited number of values and a short repeat rate, for example, 12 samples in the example case. The local oscillator has two phases as an in phase (I) and quadrature phase (Q) with 12 individual phase shifts of the local oscillator represented. As shown in FIG. 3C, the downconverter output is a simple point-by-point multiplication of the input and complex local oscillator.

Figure 4:
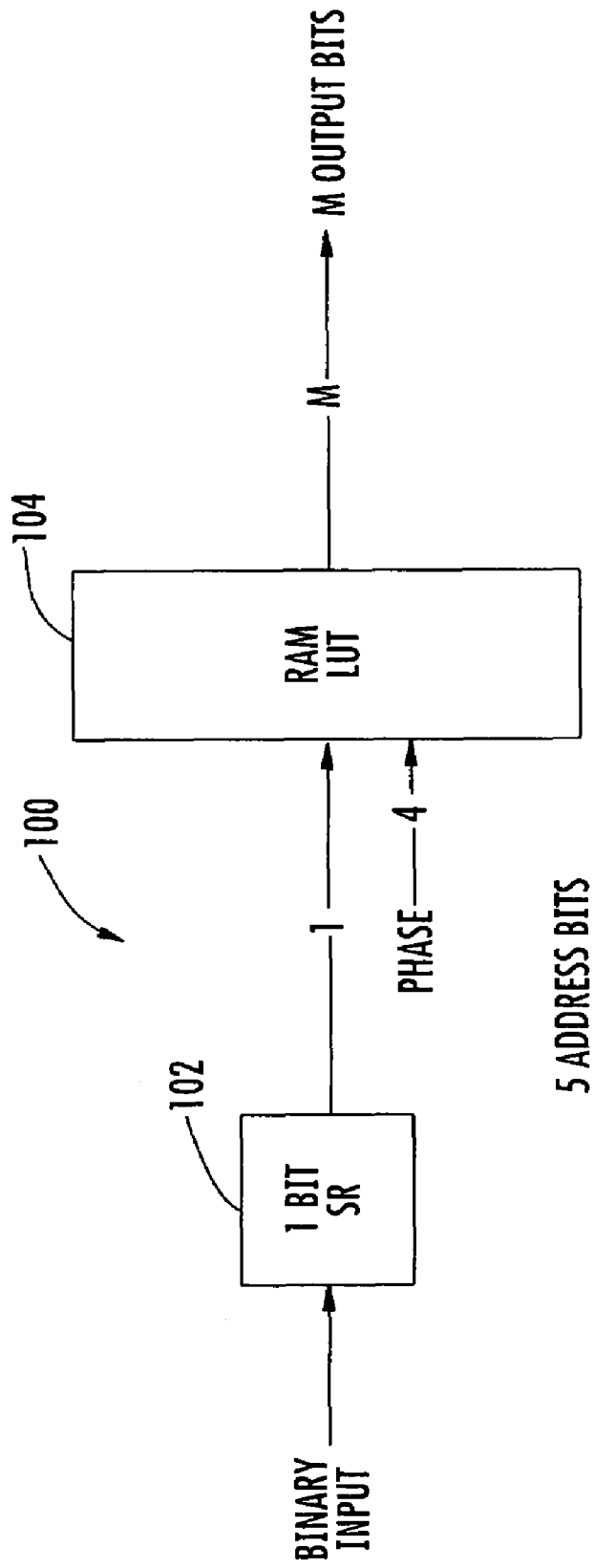
FIG. 4 is a high-level block diagram of a portion of the downconverter in accordance with one non-limiting example of the present invention and showing a shift register and RAM look-up table.

FIG. 4 is a block diagram of the circuit that can be used for a one-bit downconverter 100 having a block RAM implementation and showing the binary input into a one-bit shift register 102 and a RAM look-up table 104 that receives a phase signal and operative at 5 address bits for producing M output bits as illustrated. The binary inputs are used to address the block RAM memory locations and the one-bit shift register 102 captures the input samples. Additional address bits can be used to indicate the local oscillator phase. In this non-limiting example, there are 12 phases for a 2 MHz local oscillator signal that requires four bits. The phase can be incremented (MOD 12) for each binary input. The counter can be increased by three at 90 degrees to obtain an imaginary output. The outputs of the complex downconverter can be pre-computed and the outputs for all possible combinations of input values and clock phases can be stored in RAM. The output values can be stored as M-bit wide numbers.

Figure 5:
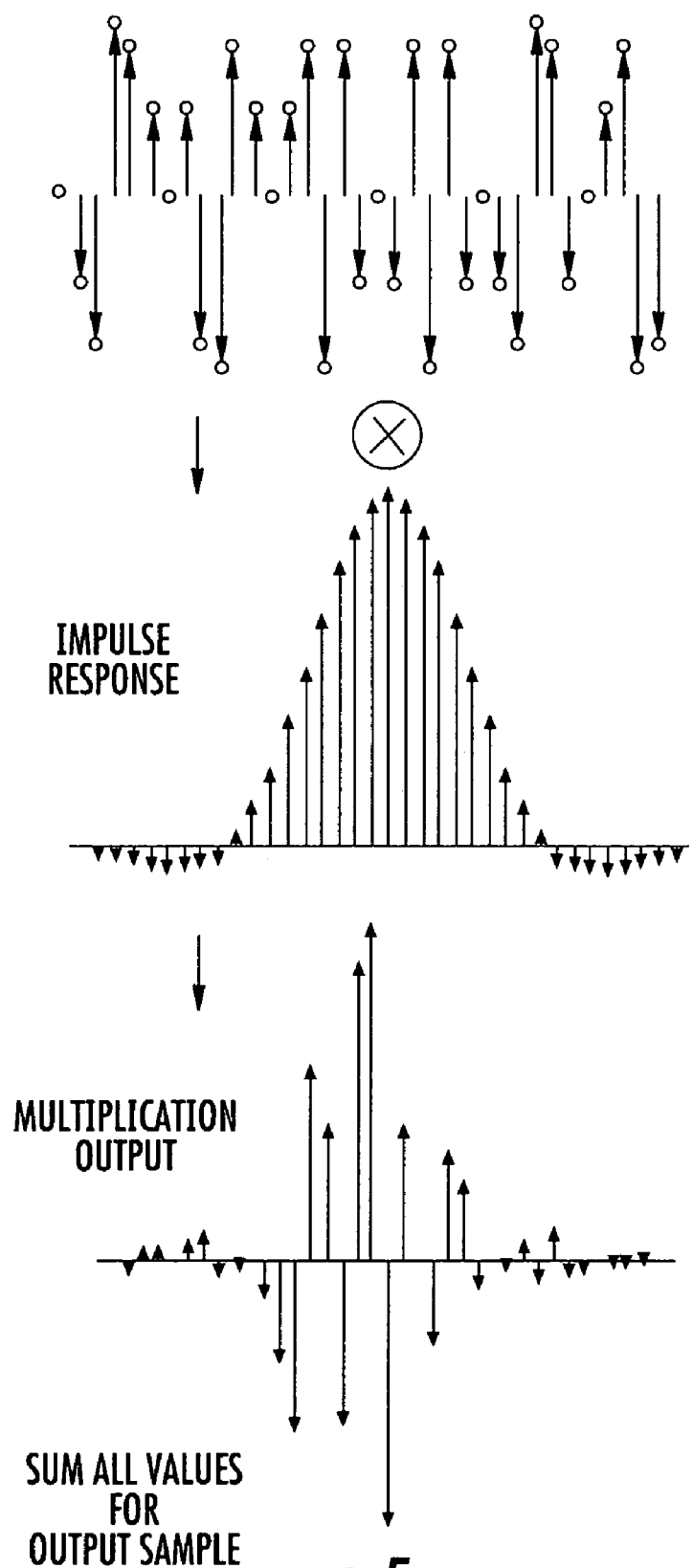
FIG. 5 is a graphic representation of low pass filtering beginning with the finite impulse response filter and ending with an output sample in accordance with one non-limiting example of the present invention.

As shown in the graphical representations of FIG. 5, low pass filtering can be accomplished as shown by the process flow represented by the three graphs, and showing the downconverter output as a simple point-by-point multiplication of the input and a complex local oscillator as shown in FIG. 3C, followed by mixing within the mixer. The impulse response is shown. The multiplication filter output sample is shown as a sum of all values for the output sample.

In one non-limiting aspect of the present invention, the low pass filter can be a 35 tap finite impulse response filter (FIR). Thirty-five of the latest input samples can be multiplied point-by-point with the filter impulse response. The input signals are the output of the complex multiplier. Individual output points are summed to create a single output for that time sample. Input samples are then shifted in time as a new sample arrives and the process repeated. The decimation takes one out of every "L" samples or one out of five for decimation by five. The filtering process is only required to take place on every fifth sample. Therefore, there is typically only one sample out of the RAM for every L input samples.

Figure 6:
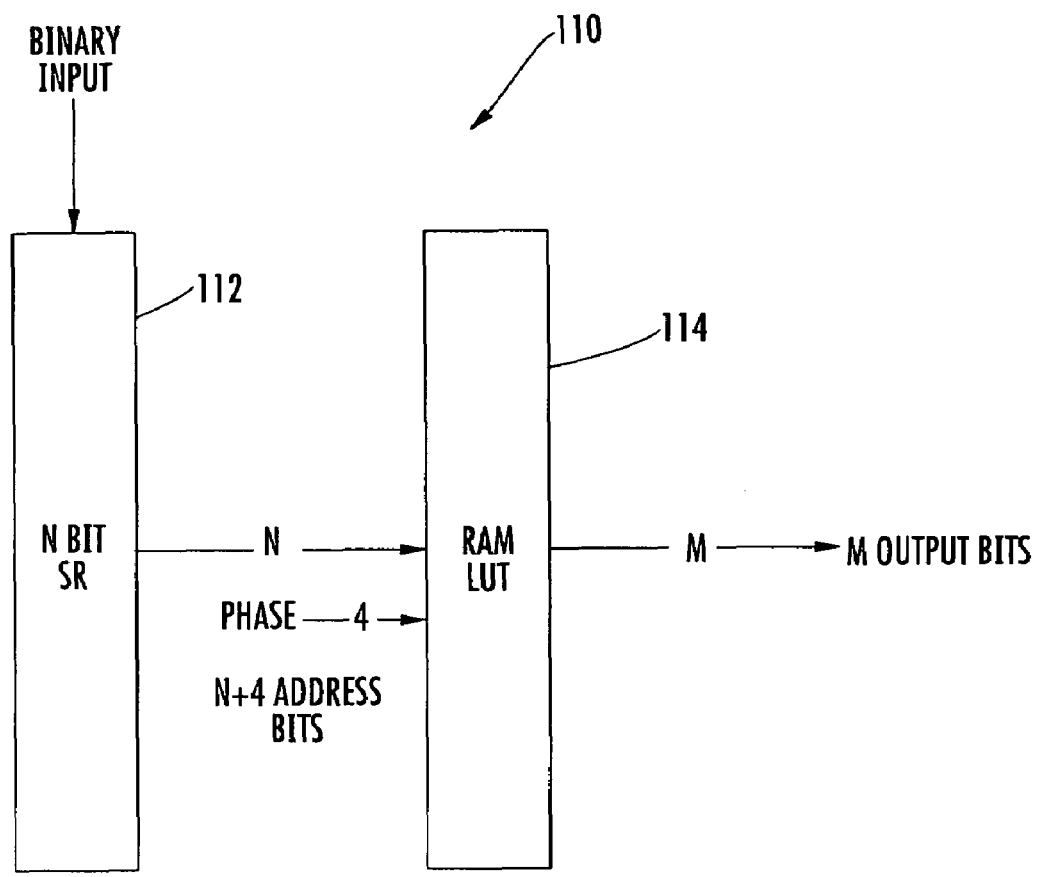
FIG. 6 is a block diagram of a downconverter low pass filter and decimator and block RAM that can be used in accordance with one non-limiting example of the present invention and showing a shift register and RAM look-up table.

FIG. 6 is a block diagram of a downconverter 110 showing a decimator and low pass filter RAM. The binary data is input into a N-bit shift register 112 and output to the RAM look-up table 114, which receive N-bits from the shift register 112 with the phase and N+4 address bits. The RAM look-up table 114 outputs M output bits as illustrated.

The complex downconversion, low pass filter and decimation function as illustrated in FIG. 6 can be combined using block RAM's, as explained below. N, one-bit binary input samples can be stored and the values used as address bits to the block RAM's. Four phase bits can be used to control the phase of a complex local oscillator. The number of phase bits is not fixed at four, but can vary depending on the number of phase of the LO that need to be used to fully describe the LO. In this case, four is sufficient because 12 samples will fully describe the LO at the selected sample rate and LO frequency. RAM values can be loaded with a pre-computed sum of all possible binary input values multiplied by the current phase of the complex local oscillator and multiplied by the filter impulse response. The output is the output sample for that point in time. Decimation can be performed by accessing RAM values only at the decimated rate. One-fifth of the input sampling clock can be made for this example and the shift register runs at the input sampling rate.

Figure 7:
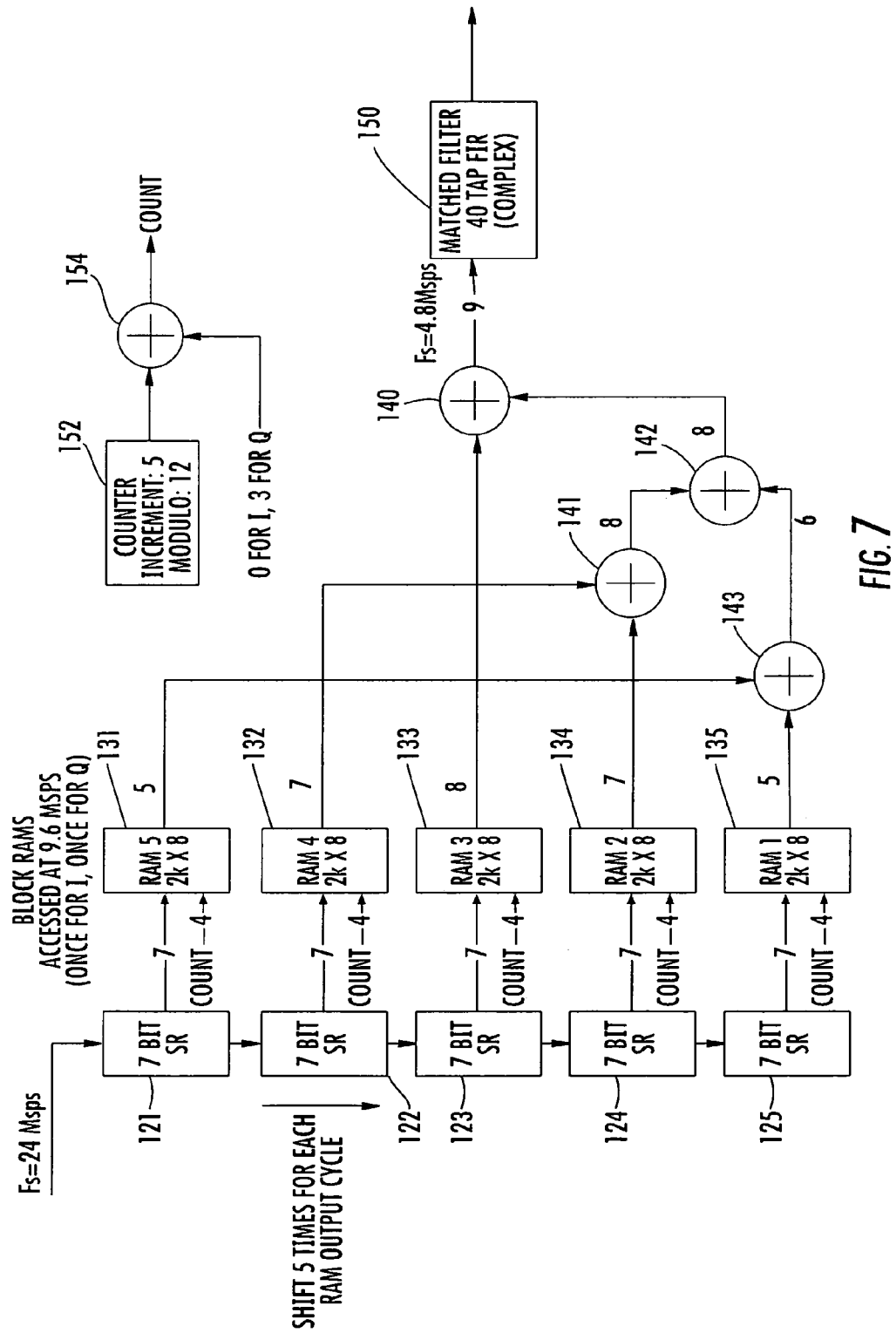
FIG. 7 is a block diagram showing a field programmable gate array (FPGA) implementation of the downconverter, in accordance with one non-limiting example of the present invention, where block RAM's are broken down into multiple block RAM's because of the limitation of the amount of memory in RAM.

FIG. 7 is a block diagram of a field programmable gate array (FPGA) implementation with block RAM functions in which five, 7-bit shift registers 121-125 are serially connected in a column as illustrated. The sampled signal at 24 Msps is received in a first shift register 121. A shift occurs five times for each RAM output cycle. Each shift register outputs into a respective RAM 131-135 for a block RAM system accessed at 9.6 Msps once for the in-phase (I) and once for the quadrature (Q). The outputs from the respective RAM's 131-135 are placed into the four summers 140, 141, 142, 143 in the manner as indicated and output into a matched filter, 40 tap and complex finite impulse response filter 150. It should be understood that the signal does not necessarily have to enter the matched filter. A counter 152 has an increment of five and modulo of 12 and inputs into a summer 154, that also outputs the count. The summer is used only to advance the phase by a specific count. This is done to get the quadrature component out of the decimator/filter. During one output sample internal, the RAM is accessed twice, once for the in-phase component and one for the quadrature component. The only change to the input address is the phase bits.

The RAM's can be broken up according to the block RAM sizing. Xilinx circuits can include 16K by one RAMS configured in any combination of input addresses and output bit widths. For this type of configuration, the RAM configuration could be about 2K by 8. There could be 11 total address lines with seven bits representing the input values from a shift register and four bits representing a current clock phase. The phase can be advanced by 90 degrees to obtain an imaginary output.

Each RAM output can accommodate 8-bit output width, but not all bits would have to be used because of the range of impulse response values. RAM's can be clocked at a lower decimation rate. The external summation creates the final output value and the adders are paired with like output data sizes. The second, standard decimating finite impulse response filter follows the block RAM implementation, which is clocked at the lower rate.

The system and method as described in accordance with these non-limiting examples of the present invention provide for the elimination of the analog/digital converter by using an analog limiting and one-bit digital sampling system that is useful for both the constant envelope phase and frequency modulated signals and non-constant envelope signals. It is a simplification of processing using one-bit values. The system can use pre-computed values stored in RAM or ROM that are addressed by the one-bit input values and a phase counter. It can perform down conversion, low pass filtering and decimation in one step at a low sample rate to save power.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A system of downconverting an intermediate frequency (IF) phase, frequency or amplitude modulated signal or combination to a digital baseband, comprising:
    an N bit shift register circuit that receives a binary input as a 1-bit input sample data stream of an IF signal; and
    a decimation circuit that includes a memory and receives data from the N bit shift register circuit and stores N 1-bit binary samples as address bits and performs decimation by accessing memory values at a predetermined rate and performs a multiplication process of the 1-bit input sample data stream and a complex local oscillator (LO) data stream.

2. A system according to claim 1, wherein said decimation circuit is operative as a look-up table to perform the multiplication process.

3. A system according to claim 2, wherein address bits in the decimation circuit are indicative of a complex local oscillator (LO) phase.

4. A system according to claim 1, and further comprising a summer circuit operatively connected to said decimation circuit to create a single output for a time sample.

5. A system according to claim 4, and further comprising a low pass filter that receives data from said summer circuit.

6. A system according to claim 5, wherein said low pass filter circuit comprises a matched filter.

7. A system according to claim 1, wherein said memory of said decimation circuit comprises a block random access memory (RAM).

8. A system of downconverting an intermediate frequency (IF) phase, frequency or amplitude modulated signal or combination to a digital baseband, comprising:
    a plurality of N bit shift registers arranged to receive a binary input as a 1-bit input sample data stream of an IF signal and shift data a predetermined number of times; and
    a decimation circuit formed from individual memory circuits that connect respective ones of the shift registers and receive data from the N bit shift registers and store N 1-bit binary samples as address bits and perform decimation by accessing memory values at a predetermined rate and performs a multiplication process of the 1-bit input sample data stream and a complex local oscillator (LO) data stream.

9. A system according to claim 8, wherein said decimation circuit is operative as a look-up table to perform the multiplication process.

10. A system according to claim 9, wherein address bits in the decimation circuit are indicative of a complex local oscillator (LO) phase.

11. A system according to claim 8, and further comprising a summer circuit operatively connected to said decimation circuit to create a single output for a time sample.

12. A system according to claim 11, and further comprising a low pass filter that receives data from said summer circuit.

13. A system according to claim 12, wherein said low pass filter circuit comprises a matched filter.

14. A system according to claim 8, wherein said memory of said decimation circuit comprises a block random access memory (RAM).

15. A method of downconverting an intermediate frequency (IF) phase, frequency or amplitude modulated signal or combination to a digital baseband, which comprises:
    sampling the IF signal using a 1-bit representation to form a 1-bit input sample data stream;
    storing N 1-bit binary samples as address bits to a memory; and
    performing decimation on the 1-bit input sample data stream by accessing memory values at a predetermined rate and performing a multiplication process of the 1-bit input sample data stream and a complex local oscillator (LO) data stream.

16. A method according to claim 15, which further comprises using memory as a look up table to perform the multiplication process.

17. A method according to claim 15, which further comprises loading the memory with a precomputed sum of possible binary input values multiplied by a current phase of a complex local oscillator.

18. A method according to claim 15, which further comprises multiplying the values of block RAM by a filter impulse response such that the output is the output sample at that time.

19. A method according to claim 15, which further comprises limiting the IF signal to a frequency or phase modulated square wave signal before sampling the signal.

20. A method according to claim 15, which further comprises controlling the phase of a complex local oscillator with 4 phase bits.

21. A method according to claim 15, which further comprises running a shift register at an input sampling rate.

22. A method according to claim 15, which further comprises clocking the decimation circuit at a lower decimation rate.

23. A method according to claim 15, which further comprises indicating a complex local oscillator phase by address bits for the decimation circuit.

24. A method according to claim 15, which further comprises receiving data within a plurality of N bit shift registers operative with the decimation circuit.

* * * * *